Patented May 18, 1943

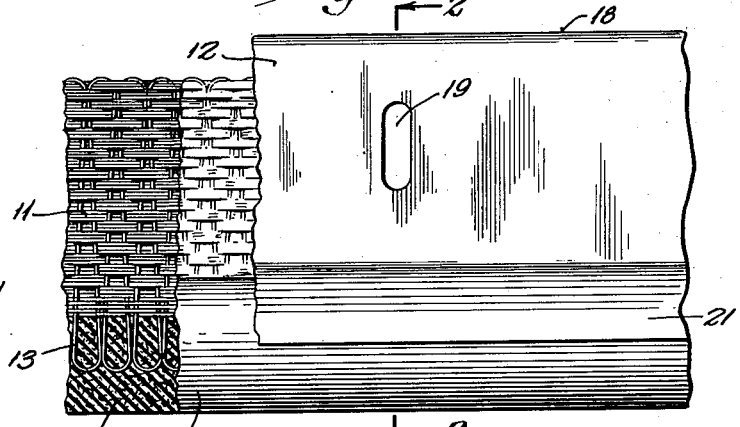
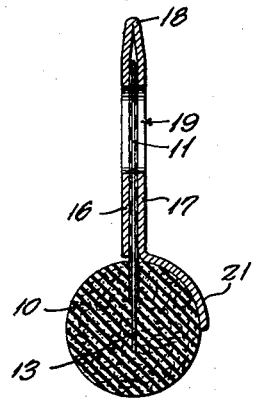
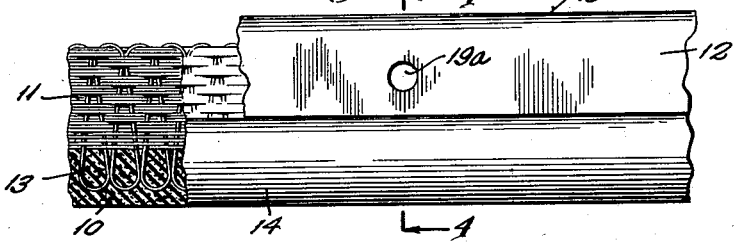
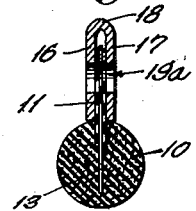
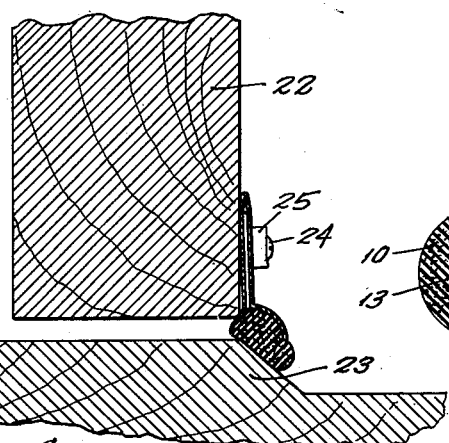
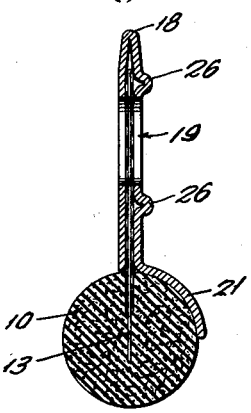

2,319,709

UNITED STATES PATENT OFFICE 2,319,709

SEALING STRIP

Louis Spraragen, Bridgeport, Conn., assignor to Bridgeport Fabrics, Inc., Bridgeport, Conn., a corporation of Connecticut Application January 4, 1941, Serial No. 373,125

7 Claims. (Cl. 20—69)

This invention relates to closure sealing strips for general use, and particularly for use as weather stripping on doors and windows.

In providing weather stripping for use with movable closures, such as doors or windows, to seal the clearance spaces around the same, difficulty has been encountered in making a strip and so mounting it that it will withstand the hard usage to which it is subjected during use, especially when used to seal the space between the bottom of the entrance door and the saddle of the doorway.

The strips heretofore used comprised a sealing bead and an attaching flange of flexible material, such as rubber, fabric or the like. When such a strip was secured to the door or window, the lateral pressure, necessary to force the bead into sealing relation with the opening, produced a strain on the attaching flange and caused the flange to tear away from the securing means.

To lessen this tendency, a large number of securing means were employed and placed closely together so as to divide this pressure and render it insufficient to tear the flange.

Also, when the door was opened and closed, the movement of the sealing strip over the floor or rug adjacent the opening placed a drag on the strip which tended to tear the attaching flange.

According to the present invention, these difficulties have been overcome by providing the sealing strip with a reinforcing member which overlies the attaching flange and is secured thereto to form therewith a relatively stiff attaching member. This attaching member, since it is relatively stiff, makes it easier to handle the strips in shipping, storage and use, especially when cut in predetermined lengths. Since the attaching member is substantially straight and relatively stiff, it also serves as its own straight edge when mounting the same in position on a door or other closure. These features of the strip make it more easily installed.

In mounting the thus reinforced sealing strip, only a few securing means are necessary, as the attaching member will not tear but will withstand greater lateral forces.

In one form of the invention the reinforcing member extends about a portion of the bead and forms a backing member which serves to reinforce the bead against lateral pressure. This bead acts, when the movable closure is moved to closed position, to hold the bead against substantial lateral movement in the direction of the reinforcing extension and forces the bead into the clearance opening. The sealing strip thus constructed, however, has greater freedom for flexure in the opposite direction as the closure is moved to the open position. This is a highly desirable feature of the invention, for it enables the sealing strip to be pressed into sealing relation with the closure member while at the same time free to yield as the closure member is moved to open position.

While the sealing strip may be mounted in many ways, according to the preferred form of the present invention the attaching member is provided with apertures at spaced intervals, and the securing means are passed therethrough to draw it into firm engagement with the closure. These openings may be circular or may be elongate transversely of the attaching member to permit adjustment of the bead with respect to the edge of the closure.

In securing the attaching member in position, the resilient means may be provided under the heads of the securing means. This will enable the whole sealing strip to yield or pivot about its free edge as it is moved into closed position, and, due to the energization of the resilient means by this movement, properly position the bead and also apply a supplemental force to the bead to force it into the opening.

If desired, the metal reinforcing strip can be provided with longitudinally extending ribs or corrugations formed thereon to extend parallel to the bead, and these ribs will aid in stiffening the sealing strip and holding it against longitudinal bending, but, however, will not affect the application of pressure by the bead.

Other features and advantages of the invention will be apparent from the specification and claims when taken in connection with the drawing, in which:

Figure 1 is an elevational view, partly broken away, showing one form of the invention;

Fig. 2 is a sectional view, taken along line 2—2 of Fig. 1.

Fig. 3 is an elevational view, partly broken away, of another form of the invention.

Fig. 4 is a sectional view, taken along line 4—4 of Fig. 3.

Fig. 5 is a sectional view of the bottom of a door with the weather strip of the type shown in Fig. 1 in position.

Figs. 6 and 7 are elevational views of the weather strips shown in Figs. 3 and 1, respectively.

Fig. 8 is a sectional view of the invention in which reinforcing ribs are applied to the metal strip.

The sealing strip of the present invention includes a bead 10 and an attaching flange 11 projecting from one side of the bead and a reinforcing member 12 for the attaching flange.

In the preferred form of the invention, the bead and attaching flange is similar to that disclosed in my copending application Serial No. 270,581, filed April 28, 1939, now Patent No. 2,232,570, granted Feb. 18, 1941, wherein a sponge rubber bead 10 is secured along one edge of a flexible woven attaching flange 11 by being interlocked with projecting loops 13 on the flange. The combined strip is covered with a cover 14 deposited from a dispersion of latex which is bonded by means of a bonding compound to the bead and/or attaching flange.

This strip, disclosed in my prior application, is employed in sealing the openings of automobile bodies and the like, and the attaching flange is attached to the metal parts of the body and the bead is used as a compression member to seal the edges of the closure. This attachment is satisfactory, since lateral strains are not applied thereto.

The sealing strip of the present invention, which may be applied to general uses, is particularly adaptable for sealing the clearance openings about doors, windows or the like wherein a substantial lateral pressure is required.

As is shown in the drawing, the attaching flange is provided with a metal reinforcing member 12 which has side elements 16 and 17 extending over both sides of the flange and joined together at the free edge of the flange at 18 to form a channel surrounding the flange. This reinforcing member may be of metal or other relatively stiff or rigid material and can be of one piece folded around the flange or of a plurality of elements secured together.

When the reinforcing member is secured to the flange, it forms therewith an attaching member by which the strip can be secured in place. The thus reinforced sealing strip is relatively stiff so that it can be readily handled, and, as shown in Figs. 6 and 7, presents a straight edge which makes the installation of the strip along the bottom of the door or the like very simple as it aids in aligning the strip, and, through the stiffness of the strip, holds it in position during the securing of the strip.

The strip may be provided with means at spaced intervals whereby it can be readily secured to the closure. As is shown in Figs. 1 and 2, the attaching member can be provided with elongate apertures 19 extending transversely of the member so that the strip can be adjusted with respect to the closure to properly position the bead to seal the edge thereof, or can be provided simply with a round aperture 19a as shown in Figs. 3 and 4 by which it is secured against adjustment.

These apertures, as shown in Figs. 6 and 7, can be placed at substantial intervals along the strip so that fewer securing means are required to adequately anchor the strips in position. This feature also renders the installation of the sealing strip easier.

In the form of the invention shown in Figs. 1 and 2, which is capable of withstanding heavy lateral pressures, one side of the reinforcing member is provided with an extension 21 which is carried around and overlies at least a portion of one side of the bead and serves to back up the bead and prevents undue movement of the bead in that direction.

One of these strips, of the type shown in Figs. 1 and 2, is shown in Fig. 5 as being installed on a door 22 to seal the opening between the bottom of the door and the saddle 23. It will be noted that the extension 21 of the reinforcing member prevents undue backward movement of the bead at the point of sealing the joint and forces the material of the bead into the opening between the door and the saddle to seal the space therebetween.

While the weather strip shown in Figs. 1 and 2 is held against substantial movement in the direction of the extension as the door is moved to closed position, the bead has a greater freedom for flexure as the door moves to the right of Fig. 5 to open position.

This construction of the sealing strip is highly advantageous. For example, as the door is being closed and the sealing strip engages a rug or the like adjacent the door, the bead will move about the bottom of the extension and yield slightly to permit the door to move to closed position. However, as the door is moved into open position, and the edge of the rug is encountered, the bead of the sealing strip will be free to move about its upper edge and will readily pass over the edge of the rug, thus permitting the door to open easily.

The sealing strip may be secured to the door in any desired manner, as by screws or nails 24 passing through the apertures 19. In some installations, it may be desired, in mounting the strip on the door, to provide a greater resiliency. This is accomplished by employing a resilient connection between the screw or other securing means and the attaching member to permit the sealing member to give when in sealing relation. This connection may comprise a block of resilient rubber 25 or a small coil spring, or other similar element. When such a construction is used, it will be seen that as the closure is moved into closed position, the reinforced attaching member will pivot about the free end 18 thereof and be forced into proper position.

The attaching member, as it is thus moved, will energize the connector to apply an additional and/or supplemental force to the bead to insure that it properly seals the joint.

If it is desired to add rigidity to the attaching member in order to prevent it from bending longitudinally without impairing its transverse movement, the present invention provides longitudinally extending ribs or corrugations 26 which may be rolled into one wall of the reinforcing member and which effectively retard any bending action.

This construction increases the stiffening action of the reinforcing member so that the units of predetermined length formed thereby, even though they may be of considerable length, will not unduly bend or flex while being handled.

In its broader aspects, the present invention contemplates the reinforcing of the attaching flange of the sealing strip by a substantially rigid reinforcing strip secured thereto. This strip may be secured to the flange in any desired manner, as by a suitable adhesive, rivets or eyelets passing therethrough. If eyelets are used, these, of course, provide the apertures by which the reinforced sealing strip can be attached.

Should the metal reinforcing member be applied to only one side of the attaching flange of the sealing strip, the sealing strip could be coiled for storage, if desired.

While the weather strip may be made of very long continuous lengths and cut to the desired requirements, in the preferred form of the invention it is precut to predetermined strip lengths as shown in Figs. 6 and 7.

Variations and modifications may be made within the scope of the invention and portions of the improvements may be used without others.

I claim:

1. A sealing strip including a bead of relatively soft, compressible material, an attaching strip of flexible, resilient, noncompressible, tear-resisting material having one edge anchored in said bead, a relatively rigid reinforcing strip overlying at least one side of the attaching strip and fixed thereto, said reinforcing strip extending around a portion of the bead and forming a backing therefor for holding the bead against lateral movement in one direction, the attaching strip adjacent the bead flexing to permit lateral movement of the bead in the other direction.

2. In combination with an opening and a closure therefor, of a sealing strip comprising a resilient compressible bead having an attaching flange anchored therein and projecting therefrom; a rigid sheath overlying said flange and extending partly around the back of the bead; and means cooperating with said sheathed attaching flange for yieldingly and resiliently mounting said sealing strip on the closure with the bead of the weather strip projecting beyond the edge of the closure to engage the edge of the opening and seal the space between the closure and edge of the opening, said means yielding when the closure is moved to closed position to apply supplemental pressure to the bead in the direction of the closure to insure the firm engagement of the bead with the closure and edge of the opening to seal the space therebetween.

3. In combination with an opening and a swinging closure, of a sealing strip comprising a compressible resilient bead having a flexible nontearing attaching flange secured along one edge and projecting therefrom, and a rigid reinforcing strip overlying said attaching flange and extending partially around one side of the bead to yieldingly support the bead, said sealing strip being mounted on said closure with a major portion of the bead projecting beyond the edge of the closure to seal the same, the flexible attaching flange allowing the bead relative freedom of movement in one direction of movement of the closure and the extension of the reinforcing strip holding the bead against movement in the other direction of movement of the closure.

4. In combination with an opening and a closure therefor, of a sealing strip comprising a resilient compressible bead having an attaching flange anchored therein and projecting therefrom; a rigid sheath overlying said flange and extending partly around the back of the bead; and means for mounting the weather strip with the bead engaging the closure and edge of the opening and overlying the space therebetween, the portion of the rigid sheath extending around the part of the bead opposite the engaging portion and restraining movement thereof whereby the bead is forced into intimate contact with the edge of the opening and closure and completely seals the space therebetween.

5. A sealing strip including a compressible resilient bead, an attaching strip of flexible, resilient, tear-resisting material secured to the bead to project therefrom, a relatively stiff reinforcing member overlying at least one side of the attaching strip and secured thereto, said attaching strip flexing and allowing movement of the bead with respect to the reinforcing member without tearing said bead, the reinforcing member extending around and forming a backing for the portion of the bead opposite the engaging face thereof to restrain movement of and deformation of the compressible bead when in sealing position.

6. A weather strip unit of predetermined length comprising a bead of soft compressible material; an attaching strip of resilient, flexible, noncompressible, tear-resisting material having one edge anchored in said bead; a metal channel on the other edge overlying at least a part of the tear-resisting attaching strip with the walls thereof gripping and clamping the strip therebetween, said metal channel holding the bead and attaching strip extended full length, the resilient attaching strip beyond the metal channel flexing in one direction when lateral pressure is applied to the bead and allowing the bead to move with respect to the metal channel without tearing the soft compressible material, a portion of said metal channel extending around the bead and holding it against movement in the other direction.

7. A sealing device for use with an opening and a movable closure therefor, comprising a compressible resilient bead, a flexible, noncompressible, nontearing attaching flange having one edge embedded in and secured to the bead and the remainder projecting therefrom, and a rigid reinforcing strip overlying said attaching flange and extending partially around one side of the bead to yieldingly support the bead, said sealing strip being adapted to be mounted with a major portion of the bead overlying the space between the edge of the opening and the edge of the closure to seal the same, the flexible attaching flange allowing the bead relative freedom of movement in one direction of movement of the closure and the extension of the reinforcing strip holding the bead against movement in the other direction of movement of the closure.

LOUIS SPRARAGEN.